(12) United States Patent
Chuang et al.

(10) Patent No.: US 11,315,745 B2
(45) Date of Patent: Apr. 26, 2022

(54) KEY STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Wei-Pin Chuang, Taipei (TW); Ming-Fu Yen, Taipei (TW); Chih-Jen Kuo, Taipei (TW)

(73) Assignees: LITE-ON ELECTRONICS (GUANGZHOU) LIMITED; LITE-ON TECHNOLOGY CORPORATION

(*) Notice: Subject to any disclaimer, the term of this patent is extended or adjusted under 35 U.S.C. 154(b) by 0 days.

(21) Appl. No.: 16/902,916

(22) Filed: Jun. 16, 2020

(65) Prior Publication Data

US 2020/0402735 A1   Dec. 24, 2020

Related U.S. Application Data

(60) Provisional application No. 62/863,251, filed on Jun. 18, 2019.

(30) Foreign Application Priority Data

May 21, 2020   (CN) .......................... 202010437051.6

(51) Int. Cl.
*H01H 3/12* (2006.01)
*H01H 13/14* (2006.01)
(Continued)

(52) U.S. Cl.
CPC ........... *H01H 3/125* (2013.01); *G02B 6/0036* (2013.01); *G02B 6/0055* (2013.01);
(Continued)

(58) Field of Classification Search
CPC ...... H01H 3/125; H01H 13/705; H01H 13/14; H01H 13/70; H01H 13/704;
(Continued)

(56) References Cited

U.S. PATENT DOCUMENTS

| 2014/0014488 | A1* | 1/2014 | Tsai ....................... H01H 13/88 200/5 A |
| 2019/0238131 | A1* | 8/2019 | Yang .................... H03K 17/968 |
| 2019/0244773 | A1* | 8/2019 | Zou ...................... H01H 13/705 |

FOREIGN PATENT DOCUMENTS

| CN | 201853593 U | 6/2011 |
| CN | 108962654 A | 12/2018 |

OTHER PUBLICATIONS

Communication corresponding to Chinese Application No. 202010437051.6 and issued by the China National Intellectual Property Administration dated Jan. 27, 2022, 9 pages.

* cited by examiner

*Primary Examiner* — Ahmed M Saeed
(74) *Attorney, Agent, or Firm* — Innovation Counsel LLP

(57) ABSTRACT

A key structure, including a keycap, a scissor component, an elastomer, an optical switch, a shading portion, and a circuit board, is provided. The scissor component is formed of a first and a second supporter. The circuit board has two first and two second limiting units. The keycap has two third and two fourth limiting units. The first supporter is rotatably or slidably connected to the first and the third limiting units. The second supporter is rotatably or slidably connected to the second and the fourth limiting units. The keycap is disposed on the circuit board through the scissor component. The elastomer is interposed between the circuit board and the keycap. The optical switch includes an emitter and a (Continued)

receiver. The shading portion is disposed on the first or the second supporter to block a light signal transmitted between the emitter and the receiver.

5 Claims, 3 Drawing Sheets

(51) Int. Cl.
| | |
|---|---|
| *H01H 13/785* | (2006.01) |
| *H01H 13/83* | (2006.01) |
| *F21V 8/00* | (2006.01) |
| *G06F 3/02* | (2006.01) |
| *H01H 13/704* | (2006.01) |
| *H01H 13/7057* | (2006.01) |
| *H01H 13/705* | (2006.01) |

(52) U.S. Cl.
CPC .......... *G06F 3/0202* (2013.01); *H01H 13/14* (2013.01); *H01H 13/704* (2013.01); *H01H 13/705* (2013.01); *H01H 13/7057* (2013.01); *H01H 13/785* (2013.01); *H01H 13/83* (2013.01); *G02B 6/0073* (2013.01); *H01H 2203/052* (2013.01); *H01H 2219/039* (2013.01); *H01H 2221/058* (2013.01); *H01H 2229/044* (2013.01)

(58) Field of Classification Search
CPC .......... H01H 13/7065; H01H 13/7006; H01H 13/7057; H01H 13/78; H01H 13/79; H01H 13/52; H01H 13/703; H01H 13/507; H03K 17/969; H03K 17/968; H03K 17/943; H03K 17/9629; H03K 17/9631; H03K 17/9638
See application file for complete search history.

KEY STRUCTURE

This application claims the benefits of US provisional application Ser. No. 62/863,251, filed Jun. 18, 2019, and People's Republic of China application Ser. No. 202010437051.6, filed May 21, 2020, the subject matters of which are incorporated herein by reference.

BACKGROUND OF THE INVENTION

Field of the Invention

The invention relates in general to a key structure and a keyboard using the same, and more particularly to a simplified key structure having an optical switch.

Description of the Related Art

Generally speaking, the keyboard has become an indispensable input device to the computer, and it has become a prominent task for the keyboard manufacturers to provide a key structure, which is thin, light and durable, particularly to a portable, thin and lightweight computer with a keyboard featured by long lifespan. Due to the structure being too complicated and the total height requirement of the key structure being too high, the conventional optical axis keyboard cannot meet the thinness requirement. Therefore, the user cannot use the optimized optical axis keyboard on the ultra-thin computer, and this problem needs to be resolved.

SUMMARY OF THE INVENTION

The invention is directed to a key structure and a computer input device using the same to reduce the height of the conventional optical axis keyboard to improve the strength and reliability thereof. The computer input device is such as a keyboard.

According to one embodiment of the present invention, a key structure and a computer input device using the same are provided. The key structure includes a keycap, a scissor component, an elastomer, an optical switch, a shading portion, and a circuit board. The scissor component is formed of a first supporter and a second supporter pivotally connected to the first supporter. The circuit board has a first limiting unit and a second limiting unit disposed thereon. The keycap has a third limiting unit and a fourth limiting unit. The first supporter of the scissor component is rotatably or slidably connected to the first limiting unit disposed on the circuit board and the third limiting unit disposed on the key cap. The second supporter of the scissor component is rotatably or slidably connected to the second limiting unit disposed on the circuit board and the fourth limiting unit disposed on the keycap. Thus, the keycap is connected to and disposed on the circuit board through the scissor component, and the elastomer is interposed between the circuit board and the keycap. The optical switch is disposed on the circuit board, and includes an emitter and a receiver. The shading portion is disposed on the first supporter or the second supporter to block a light signal transmitted between the emitter and the receiver, such that an on/off signal can be controlled by the key structure.

According to another embodiment of the present invention, the first limiting unit and the second limiting unit can be disposed on a flexible printed circuit (FPC) board, a polyester film (such as Mylar) or other structure, and does not have to be disposed on the circuit board with the optical switch.

Through the design of disposing the first limiting unit and the second limiting unit on the circuit board or the Mylar film, the key structure of the invention can dispense with the conventional metal bottom plate, not only reducing the overall height of the key structure but also simplifying the manufacturing process and decreasing the cost.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed structures and operation principles of the invention are disclosed below in a number of embodiments with accompanying drawings. However, the disclosed embodiments are for explanatory and exemplary purposes only, not for limiting the scope of protection of the invention.

Figure 1:
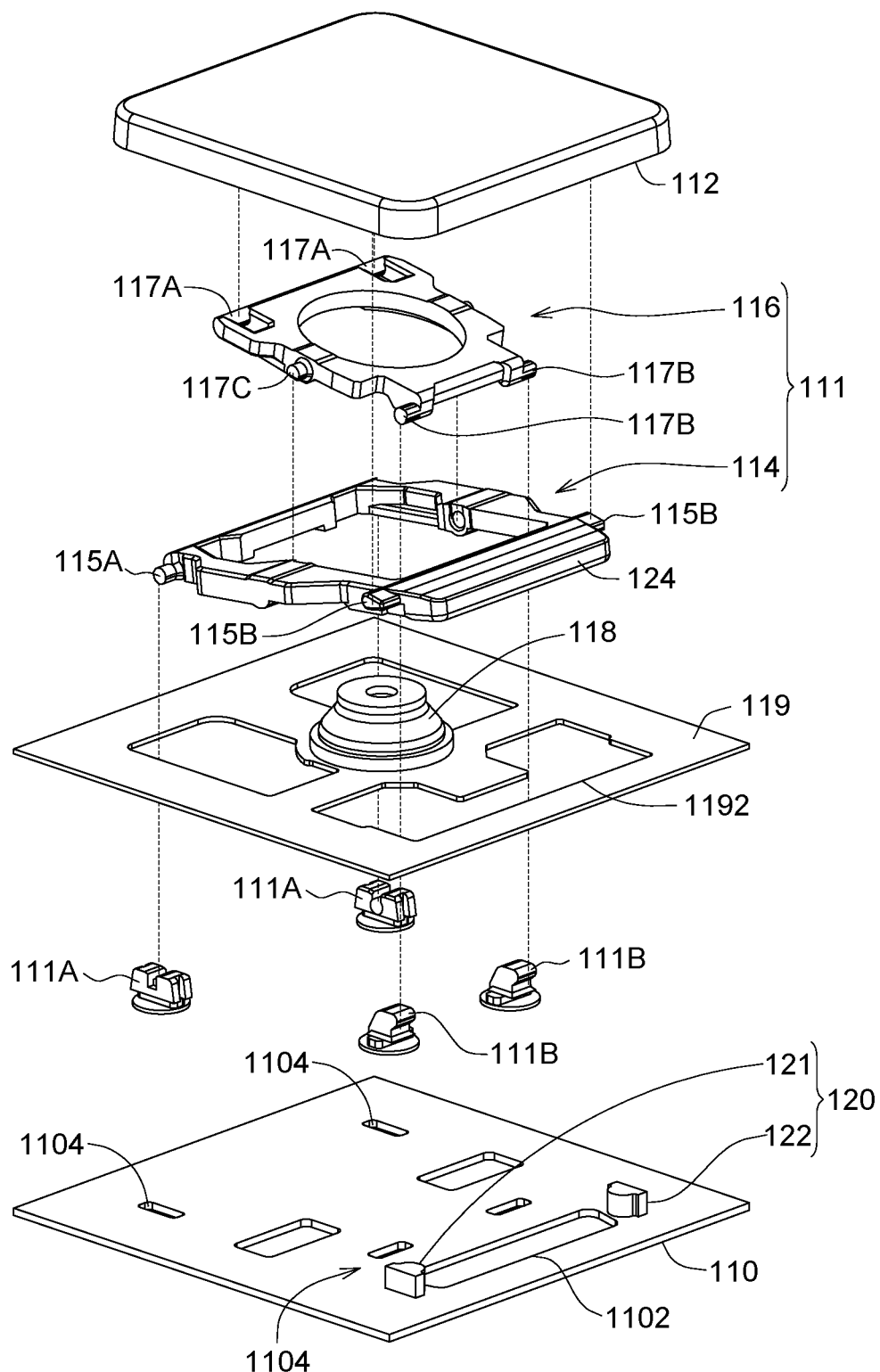
FIG. 1 is an explosion diagram of a key structure according to an embodiment of the invention.
Figure 2:
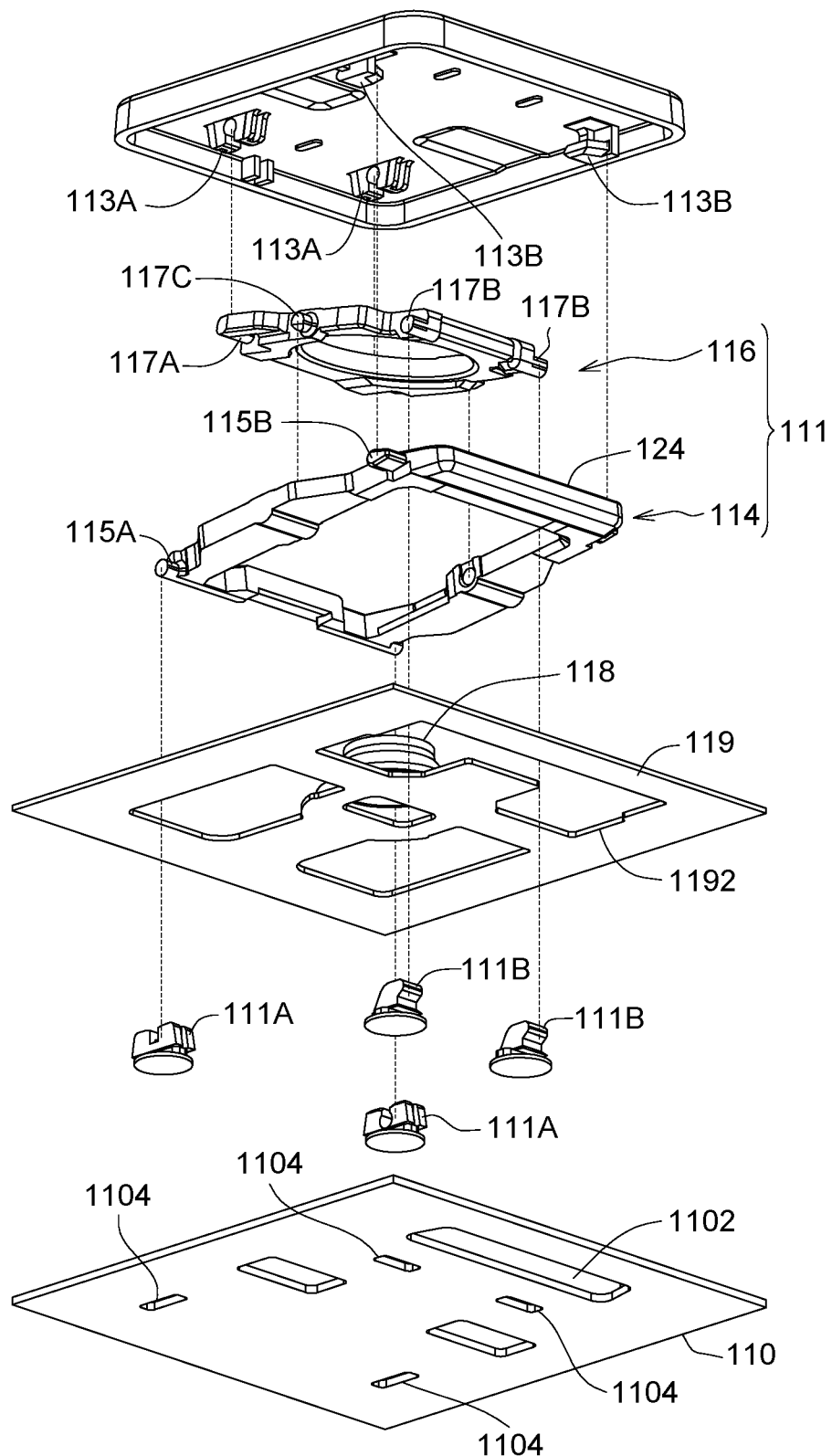
FIG. 2 is an explosion diagram of the key structure of FIG. 1 from another view angle.
Figure 3:
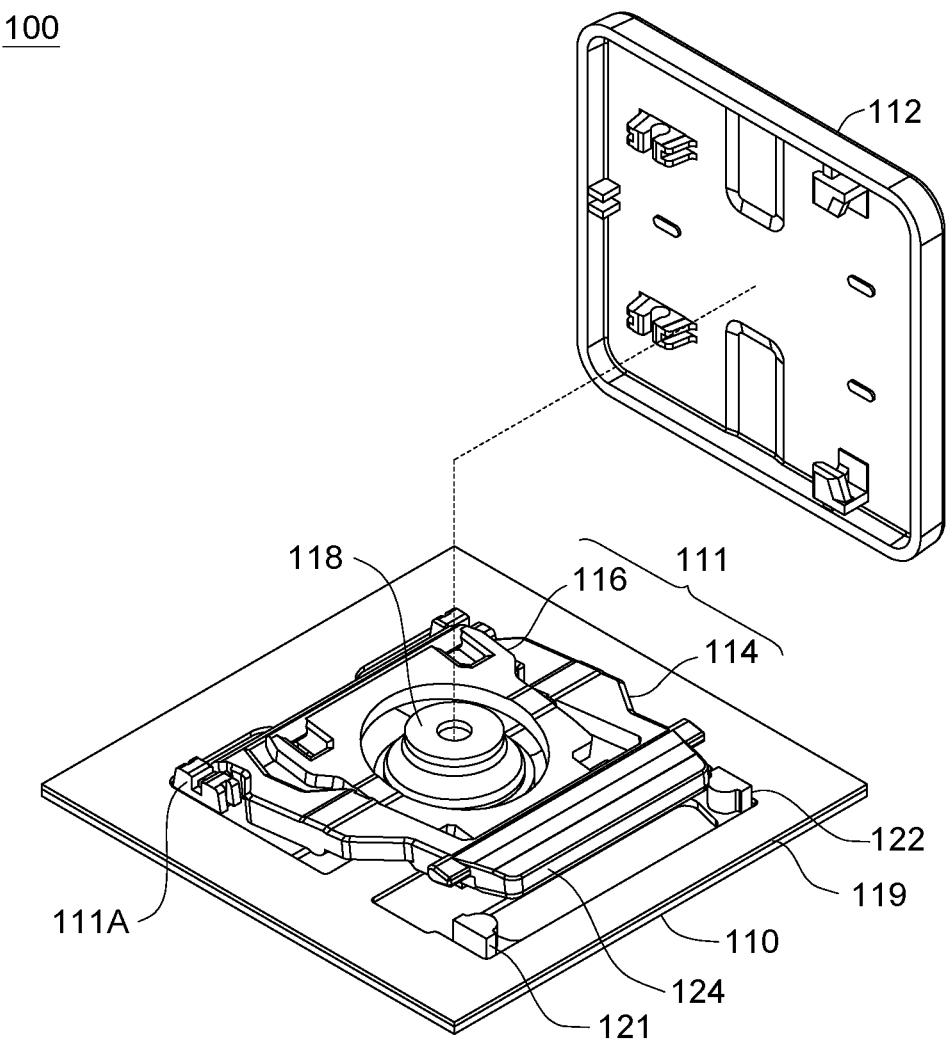
FIG. 3 is a schematic diagram of the interior of the assembled key structure of FIG. 1.

FIG. 1 is an explosion diagram of a key structure 100 according to an embodiment of the invention. FIG. 2 is an explosion diagram of the key structure 100 of FIG. 1 from another view angle. FIG. 3 is a schematic diagram of the interior of the assembled key structure 100 of FIG. 1. Refer to FIG. 1, FIG. 2, and FIG. 3. In the first embodiment, the key structure 100 includes a circuit board 110, a keycap 112, a scissor component 111, an elastomer 118, an optical switch 120 and a shading portion 124, wherein the scissor component 111 is formed of a first supporter 114 and a second supporter 116 pivotally connected to the first supporter 114.

The circuit board 110 is located at the bottommost of the key structure 100 and is configured to transmit an electric signal of the optical switch 120 to an external processor (not illustrated). The circuit board 110, for example, can be a flexible printed circuit board or other types of circuit board. The optical switch 120 is disposed on the circuit board 110, and includes an emitter 121 and a receiver 122. The emitter 121, for example, can be a ultra-red emitter or a visible light emitter. The receiver 122, for example, can be a ultra-red receiver or a visible light receiver. The emitter 121 is configured to emit a light signal. The receiver 122 is configured to receive the light signal from the emitter 121. When the light signal is cut off or blocked by the shading portion 124, the optical switch 120 correspondingly generates an electric signal, which is further transmitted to the external processor (not illustrated) through the circuit board 110 to indicate a pressing signal of the key structure 100.

In the present embodiment, the shading portion 124 is disposed on the first supporter 114 or the second supporter 116 to block a light signal transmitted between the emitter 121 and the receiver 122. As indicated in FIG. 1, the shading portion 124 is disposed on the first supporter 114, and the shading portion 124 and the first supporter 114 are integrally formed in one piece. For example, the shading portion 124 and the first supporter 114 can be formed of plastics by way of injection molding.

When the first supporter 114 is pressed to move downwards, the shading portion 124, being disposed on the first supporter 114, will be moved to a second position (lower position) from a first position (higher position) to cut off or block the light signal emitted from the emitter 121. Thus, there is no need to additionally dispose a metal component to block the light signal transmitted between the emitter 121 and the receiver 122, and the quantity of components can be reduced.

In the present embodiment, the shading portion 124 is preferably formed of a non-metal material, such as opaque plastics, such that the shading portion 124 can be conveniently formed on the first supporter 114 and the component cost can be reduced.

In another embodiment (not illustrated), the shading portion 124 is disposed on the bottom of the keycap 112 and is integrally formed in one piece with the keycap 112. Therefore, when the keycap 112 is pressed to move downwards, the shading portion 124 will move to a second position from a first position to cut off or block the light signal. Therefore, there is no need to additionally dispose a metal component to cut off or block the light signal transmitted between the emitter 121 and the receiver 122, and the quantity of components can be reduced.

As indicated in FIG. 1, the circuit board 110 has an opening 1102 formed under the shading portion 124 and interposed between the emitter 121 and the receiver 122. When the shading portion 124 moves to the second position from the first position to cut off or block the light signal, a part of the shading portion 124 can enter the opening 1102 to reduce the overall height of the key structure 100. Meanwhile, the opening 1102 can avoid the shading portion 124 pressing or hitting the circuit board 110 and generating noises.

Refer to FIG. 1 and FIG. 2. The circuit board 110 has two first limiting units 111A and two second limiting units 111B configured to connect the first supporter 114 and the second supporter 116 of the scissor component 111. The first limiting units 111A and the second limiting units 111B, for example, can be formed of plastics by way of injection molding. As indicated in FIG. 1 and FIG. 2, multiple positioning holes 1104 are pre-formed on the circuit board 110, then plastics is injected to the mold by way of in-mold injection to form two first limiting units 111A and two second limiting units 111B on the circuit board 110, and the first limiting units 111A and the second limiting units 111B are engaged with the positioning holes 1104 and are fixed thereto. Therefore, there is no need to use any viscose, screws, or other assembly components to fix the first limiting units 111A and the second limiting units 111B on the circuit board 110. Conversely, the first limiting unit and the second limiting unit are disposed on a circuit board or a polyester film (such as Mylar), and the key structure of the invention can dispense with the conventional metal bottom plate, not only reducing the overall height of the assembled key structure 100 but also simplifying the manufacturing process.

In another embodiment, even when the circuit board 110 does not have any positioning holes 1104, the first limiting units 111A and the second limiting units 111B still can be directly fixed on the circuit board 110 using other methods. Therefore, the implementation of the invention is not limited to the design of the circuit board 110 provided with multiple positioning holes 1104.

As indicated in FIG. 2, the bottom surface of the keycap 112 has two third limiting units 113A and two fourth limiting units 113B. The third limiting units 113A and the fourth limiting units 113B can be formed of plastics, and can further be formed by way of injection molding together with the cap body to connect the first supporter 114 and the second supporter 116.

Refer to FIG. 1 and FIG. 2. One end of the first supporter 114 has a first fixing shaft 115A, and the other end of the first supporter 114 has a first sliding shaft 115B. Besides, one end of the second supporter 116 has a second fixing shaft 117A, and the other end of the second supporter 116 has a second sliding shaft 117B. In an embodiment, the first fixing shaft 115A can be rotatably and pivotally connected to the first limiting units 111A, the first sliding shaft 115B can be slidably connected to the fourth limiting units 113B, the second fixing shaft 117A can be rotatably and pivotally connected to the third limiting units 113A, the second sliding shaft 117B can be slidably connected to the second limiting units 111B. Moreover, the position of the first fixing shaft 115A and the position of the first sliding shaft 115B can be swapped; the position of the second fixing shaft 117A and the position of the second sliding shaft 117B also can be swapped; the first supporter 114 and the second supporter 116 of the invention are not limited to the design of one-side fixing and one-side sliding.

Additionally, the first supporter 114 and the second supporter 116 are pivotally connected to each other through a rotation shaft 117C to form a scissor component 111, such that the first supporter 114 and the second supporter 116 can relatively rotate around the rotation shaft 117C. However, the first supporter 114 and the second supporter 116 are independent of each other, and are not necessarily connected through the rotation shaft 117C.

In an embodiment, the first supporter 114 and the second supporter 116 can form an ultra-flat scissor structure, wherein the first supporter 114, for example, can be an outer frame, the second supporter 116, for example, can be an inner frame, and the second supporter 116 is received in the first supporter 114 to save the internal space of the key structure 100 and reduce the overall height of the pressed key structure 100.

Besides, the elastomer 118 is interposed between the circuit board 110 and the keycap 112. The elastomer 118 can vertically move in a hollowed region surrounded by the first supporter 114 and the second supporter 116 to provide a resilient force required for the keycap 112 being pressed. In an embodiment, the elastomer 118, for example, can be a rubber sheet or a metal sheet disposed on a film 119 such as Mylar. The elastomer 118 can be fixed on the film 119 by viscose. The film 119 can have a patterned opening 1192, which provides space for the components, such as the first limiting units 111A, the second limiting units 111B and the optical switch 120, disposed on the circuit board 110. Alternatively, the first limiting units 111A and the second limiting units 111B are disposed on the film 119 rather than on the circuit board 110. That is, the film 119 (such as Mylar) can have multiple positioning holes (not illustrated), and the first limiting units 111A and the second limiting units 111B can be fixed on the Mylar film and engaged with the positioning holes by way of in-mold injection. Also, when the shading portion 124 moves to a second position from a first position and blocks the light signal, a part of the shading portion 124 can enter the patterned opening 1192 on the film 119 and the opening 1102 on the circuit board 110.

According to the key structure of the above embodiments, the keycap is supported by an ultra-flat scissor structure and an elastomer, such that when the keycap is pressed downwards, the keycap will drive the shading portion to block a light signal to indicate a pressing signal of the key structure.

In comparison to the key used in a conventional optical axis keyboard, the key structure of the above embodiments can be used in the optical axis keyboard without using a conventional metal bottom plate, not only resolving the problems of the conventional optical axis keyboard and cost being too high, but also allowing the user to use an optimized optical axis keyboard on an ultra-thin computer.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key structure, comprising:
    a polyester film having two first limiting units and two second limiting units disposed on the polyester film;
    a keycap having two third limiting units and two fourth limiting units disposed under the keycap;
    a scissor component comprising a first supporter and a second supporter, wherein the first supporter is connected to the first limiting units and the third limiting units, the second supporter is connected to the second limiting units and the fourth limiting units, and the keycap is connected to the polyester film through the first supporter and the second supporter of the scissor component;
    an elastomer disposed on the polyester film and configured to support the keycap;
    a circuit board disposed under the polyester film;
    an optical switch disposed on the circuit board, wherein the optical switch comprises an emitter and a receiver; and
    a shading portion disposed on the first supporter or the second supporter to block a light signal transmitted between the emitter and the receiver,
    wherein the polyester film has a plurality of positioning holes, and the first limiting units and the second limiting units are fixed on the circuit board by way of in-mold injection and are engaged with the positioning holes.

2. The key structure according to claim 1, wherein when the shading portion moves to a second position from a first position and blocks the light signal, the optical switch correspondingly generates an electric signal to the circuit board.

3. The key structure according to claim 2, wherein the polyester film has a first opening, the circuit board has a second opening, the first opening and the second opening both are disposed under the shading portion, and when the shading portion moves to the second position and blocks the light signal, at least a part of the shading portion enters the first opening and the second opening.

4. The key structure according to claim 1, wherein the shading portion is integrally formed with the first supporter or the second supporter in one piece.

5. The key structure according to claim 1, wherein one end of the first supporter or the second supporter has a fixing shaft, and other end of the first supporter or the second supporter has a sliding shaft, such that the first supporter or the second supporter rotates or slides in one or more corresponding limiting units.

* * * * *